United States Patent [19]

Ebbesen

[11] 3,753,611

[45] Aug. 21, 1973

[54] BIFOCAL MAGNIFYING GLASS TO BE HELD IN FRONT OF ONE EYE

[76] Inventor: Ejvind Ebbesen, Torvegade 56, Copenhagen, Denmark

[22] Filed: Sept. 9, 1971

[21] Appl. No.: 178,887

[30] Foreign Application Priority Data

Sept. 16, 1970 Denmark .................................. 4749

[52] U.S. Cl. ................................. 350/249, 350/247
[51] Int. Cl. ............................................. G02b 7/02
[58] Field of Search.................... 350/245, 247, 248, 350/249, 255, 257, 254; 351/49, 84, 161

[56] References Cited
UNITED STATES PATENTS 3,042,827   7/1962   Lopez ................................... 351/49
3,533,686   10/1970   O'Shea ................................... 351/84

FOREIGN PATENTS OR APPLICATIONS
1,279,252   11/1961   France ............................... 351/161

Primary Examiner—David Schonberg
Assistant Examiner—Michael J. Tokar
Attorney—Ernest A. Greenside

[57] ABSTRACT

The invention relates to a magnifying glass to be held in front of one eye and having one or more turnable lens systems with different fields of vision.

7 Claims, 4 Drawing Figures

BIFOCAL MAGNIFYING GLASS TO BE HELD IN FRONT OF ONE EYE

The invention relates to a magnifying glass to be held in front of one eye and having one or more turnable lens systems with different fields of vision.

Magnifying glasses of the type indicated are for instance used by watch-makers during their work manufacturing and repairing watches. The parts being worked on are normally located on a small raised area. The parts to be used, the supply parts, are located beside the small raised area, i.e., at a lower level. During the work, alternatively the work parts and the supply parts must be observed.

A magnifying glass of the type indicated is known where a lens system may be turned manually to the position desired.

The object of the invention is to devise a magnifying glass of the type indicated where such manual adjustment is not necessary. According to the invention, this is achieved by the fact that at least part of the lens systems is arranged with its center of gravity located excentrically in relation to the main axis of the magnifying glass, and that it is designed to be able to turn under the influence of its own weight.

The turnable portion of one of the lens systems may, according to the invention, be constituted by a substantially semi-circular lens that is loosely arranged in a circumferential track. By these means the total field of vision is divided into two substantially equal large portions which may be advantageous when working with the magnifying glass. If the frictional resistance against turning the lens system in the track is too great, there may be located rollers in the track to form a ball bearing for the lens system.

The turnable portion of one of the lens systems may, according to the invention, be constituted by a circular lens that is designed to be able to roll in a circular path. There may also hereby be obtained an advantageously large field of vision for the lens system in question. No difficulties will arise relating to turning the lens system, because it consists of a circular lens that is able to roll in a circular path.

The invention will be explained more in detail below in connection with the drawings.

Figure 1:
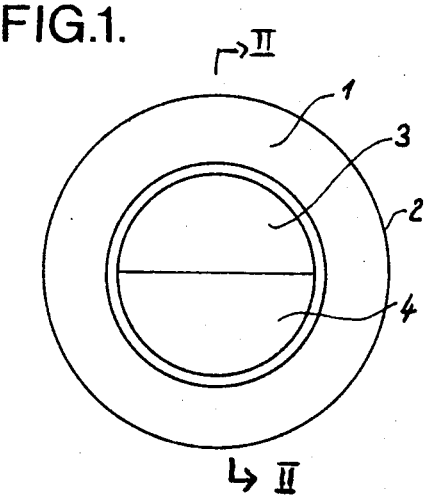
FIG. 1 shows a front view of a magnifying glass according to the invention.
Figure 2:
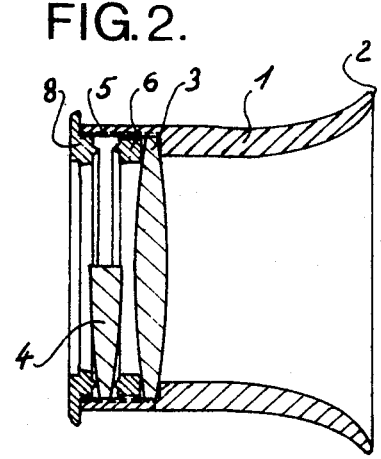
FIG. 2 is a sectional view along the line II—II in FIG. 1.

In FIGS. 1 and 2 the numeral 1 designates a tubular holding member that at one end has an outwardly projecting collar 2 to be placed in front of the eye, and in the other end has a lens system comprising a circular magnifying lens 3 and a semicircular magnifying lens 4. The lens 3 is arranged in a circular recess 5 provided with a screw thread, and it is held fast between a tightened ring 6 with a screw thread, and the shoulder 7. The semi-circular lens 4 has a slightly smaller diameter than the recess 5 and is guided between the ring 6 and a ring 8 with a screw thread. The ring 8 has a flange that determines the axial depth of engagement in such a manner that the lens 4 may turn.

When using the magnifying glass shown, the smallest magnification will be achieved in the region above the lens 4, FIG. 2. The largest magnification will be achieved by looking through the two lenses 3 and 4. When the magnifying glass is put in front of the eye and is held in a horizontal or oblique position, the lens 4 will turn down into the position shown in FIGS. 1 and 2 under the influence of gravity.

If necessary, the lens 3 may be replaced by a lens system consisting of several lenses. The same is true for the lens 4, but in that case it will be advantageous that these semi-circular lenses be located in a holder that can turn in relation to the holder 1. A ball bearing may be used.

Figure 3:
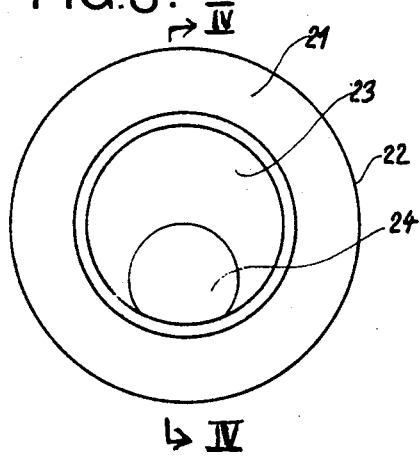
FIG. 3 shows a front view of another embodiment of a magnifying glass according to the invention.
Figure 4:
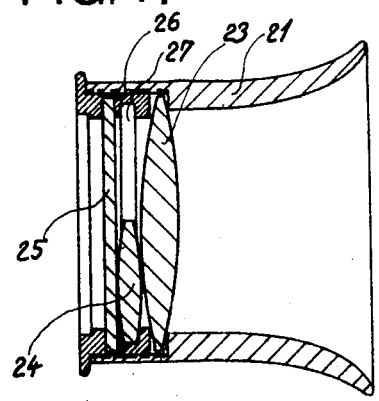
FIG. 4 is a sectional view along the line IV—IV in FIG. 3.

The magnifying glass in FIGS. 3 and 4 comprises a holding member 21 with an outwardly projecting collar 22 at one end. In the holding member's other end there is arranged a lens system consisting of a lens 23 that is fixedly arranged and fills out the cross section of the tube. Between the lens 23 and a plane glass plate 25 arranged in front of same there is a lens 24 having a smaller diameter than the lens 23, preferably approximately half the diameter of the lens 23. The lens 24 can roll on a ring 26, for instance in a groove 27 in the latter. The distance between the lens 23 and the glass plate 25 is dimensioned in such a manner that the lens 24 is loosely guided between them, preferably in such a manner that the lens 24, on account of its own and lens 23's convexity, is maintained in position in contact with or very close to the ring 26, i.e., in such a manner that it only can move in a substantially circular path. When the glass is put in front of the eye and is held in a horizontal or an inclined operative position, the lens 24 will, on account of gravity, roll down to the position shown in FIG. 3. In this embodiment there is achieved a particularly easy movement of the lens 24.

The invention is not limited to the embodiments shown but it may be varied in different manners within the scope of the claims. The lens with the large cross section may for instance be built together with the lens with the small cross section to form a unit that can move relative to the holder by means of a weight part, for instance a small lead weight part arranged at the edge of the unit near the portion that is to face downwards during use.

I claim:

1. A bifocal magnifying glass to be held in front of one eye, which comprises a tubular member having one end adapted for positioning in front of the eye for viewing therethrough, a first lens having a cross section approximately that of said tubular member and disposed in said tubular member transversely to the axis thereof, a second lens having a cross section substantially smaller than that of said first lens, said second lens being disposed in said tubular member transversely to the axis thereof and having its center of gravity located excentrically relative to the axis of said tubular member, and means for mounting said second lens in said tubular member for movement relative to said tubular member under the influence of its own weight about the axis of said tubular member.

2. A bifocal magnifying glass according to claim 1, in which said second lens has a semi-circular cross section approximately one-half of that of said tubular member.

3. A bifocal magnifying glass according to claim 1, in which said second lens has a circular cross section.

4. A bifocal magnifying glass to be held in front of one eye, which comprises a tubular member having one end adapted for positioning in front of the eye for viewing therethrough, a first lens having a circular cross section approximating that of said tubular member and disposed in said tubular member transversely to the axis thereof, means for fixedly positioning said first lens in said tubular member, a second lens having a semicircular cross section approximating one-half of that of said first lens, said second lens being disposed in said tubular member transversely to the axis thereof and having its center of gravity located excentrically relative to the axis of said tubular member, and means for mounting said second lens in said tubular member for movement relative to said tubular member under the influence of its own weight about the axis of said tubular member, said mounting means including a circumferential track arranged in said tubular member for accommodating said second lens along its semi-circular periphery.

5. A bifocal magnifying glass to be held in front of one eye, which comprises a tubular member having one end adapted for positioning in front of the eye for viewing therethrough, a first lens having a circular cross section approximating that of said tubular member and disposed in said tubular member transversely to the axis thereof, means for fixedly positioning said first lens in said tubular member, a second lens having a circular cross section substantially smaller than that of said first lens, said second lens being disposed in said tubular member transversely to the axis thereof and having its center of gravity located excentrically relative to the axis of said tubular member, and means for mounting said second lens in said tubular member for movement relative to said tubular member under the influence of its own weight about the axis of said tubular member, said mounting means being so adapted and arranged that said second lens moves in a substantially circular path.

6. A bifocal magnifying glass according to claim 5, in which said mounting means includes a flat transparent plate disposed in said tubular member transversely to the axis thereof and spaced from said first lens a distance such that said second lens is loosely guided therebetween, and means for fixedly positioning said flat transparent plate in said tubular member.

7. A bifocal magnifying glass according to claim 6, in which said second lens has a diameter approximating one-half of that of said first lens.

* * * * *